United States Patent
Lesch et al.

(10) Patent No.: US 12,480,563 B2
(45) Date of Patent: Nov. 25, 2025

(54) BOLT-TYPE ANGULAR GEAR MECHANISM

(71) Applicant: WITTENSTEIN SE, Igersheim (DE)

(72) Inventors: Michael Lesch, Essfeld (DE);
Maximilian Hanus, Bütthard (DE);
Axel Irmer, Creglingen (DE); Tim Poeschmann, Unterpleichfeld (DE);
Sebastian Michel, Gaukönigshofen (DE)

(73) Assignee: WITTENSTEIN SE, Igersheim (DE)

( * ) Notice: Subject to any disclaimer, the term of this patent is extended or adjusted under 35 U.S.C. 154(b) by 0 days.

(21) Appl. No.: 18/443,772

(22) Filed: Feb. 16, 2024

(65) Prior Publication Data
US 2024/0280162 A1 Aug. 22, 2024

(30) Foreign Application Priority Data
Feb. 16, 2023 (DE) .......................... 102023103820.6

(51) Int. Cl.
*F16H 1/14* (2006.01)
*F16D 3/08* (2006.01)

(52) U.S. Cl.
CPC ................. *F16H 1/14* (2013.01); *F16D 3/08* (2013.01)

(58) Field of Classification Search
CPC ............................. F16D 3/08; Y10S 464/904
USPC .......................................................... 464/50
See application file for complete search history.

(56) References Cited

U.S. PATENT DOCUMENTS

| 2,811,025 | A | * | 10/1957 | Redard | ..................... | F16D 3/08 |
| | | | | | | 464/7 |
| 3,782,135 | A | * | 1/1974 | Beden | ....................... | F16D 3/08 |
| | | | | | | 464/50 |
| 4,983,141 | A | | 1/1991 | Stroze et al. | | |
| 2005/0176511 | A1 | * | 8/2005 | Hsiung | ..................... | F16D 3/08 |
| | | | | | | 464/50 |

FOREIGN PATENT DOCUMENTS

| DE | 4013830 A1 | 10/1991 | |
| DE | 102017118571 A1 * | 2/2019 | ............... F16D 3/08 |
| DE | 102018123168 A1 | 3/2020 | |

OTHER PUBLICATIONS

German Search Report dated Aug. 16, 2023 for corresponding application DE10 2023 103 820.6.

* cited by examiner

*Primary Examiner* — Jake Cook
(74) *Attorney, Agent, or Firm* — Bachman & LaPointe, P.C.

(57) ABSTRACT

A bolt-type angular gear mechanism (1), having angular bolts (3) each with two limbs, which are angled in relation to each other, a first bolt carrier (11), which is rotatable about a first axis (13) and has first bolt receptacles (15), in each of which a first limb (5) of one of the angular bolts (3) is at least partially received, and a second bolt carrier (21), which is rotatable about a second axis (23), which is different from the first axis (13), and has second bolt receptacles (25), in each of which a second limb (7) of one of the angular bolts (3) is at least partially received, so that the first bolt carrier (11) and the second bolt carrier (21) are connected by means of the angular bolts (3), wherein the limbs of the angular bolt (3) have a flattened portion (39), wherein the flattened portion extends in the longitudinal direction of the limb.

17 Claims, 7 Drawing Sheets

BOLT-TYPE ANGULAR GEAR MECHANISM

FIELD OF THE INVENTION

The invention relates to a bolt-type angular gear mechanism, in particular for transmitting a rotational movement from a first shaft to a second shaft, which is orientated at an angle in relation to the first shaft.

PRIOR ART

The prior art discloses bolt-type angular gear mechanisms which transmit a torque or a rotational movement between two shafts, which are angled in relation to each other. The shafts are usually each connected in a rotationally fixed manner to a bolt carrier of the bolt-type angular gear mechanism. In known bolt-type angular gear mechanisms, the bolt carriers are connected by means of angular bolts of the bolt-type angular gear mechanism, wherein the angular bolts each comprise two limbs, which are angled in relation to each other. The angular bolts each enter, by way of one limb, a bolt receptacle of one of the bolt carriers and, by way of the other limb, a further bolt receptacle of the other bolt carrier. The angular bolts usually transmit a rotational movement between the bolt carriers, wherein the limbs of the angular bolts at least partially enter the bolt receptacles and at least partially move out of the bolt receptacles again during the rotational movement. A bolt-type angular gear mechanism of this kind is described in DE102018123168.7.

However, known bolt-type angular gear mechanisms have, in particular, a low degree of efficiency.

SUMMARY OF THE INVENTION

The invention is based on the object of specifying an improved bolt-type angular gear mechanism, in particular embodiments should have an increased degree of efficiency.

One aspect of the invention specifies a bolt-type angular gear mechanism, comprising angular bolts each with two limbs, which are angled in relation to each other, a first bolt carrier, which is rotatable about a first axis and has first bolt receptacles, in each of which a first limb of one of the angular bolts is at least partially received, and a second bolt carrier, which is rotatable about a second axis, which is different from the first axis, and has second bolt receptacles, in each of which a second limb of one of the angular bolts is at least partially received, so that the first bolt carrier and the second bolt carrier are connected by means of the angular bolts, wherein the limbs of the angular bolts have a flattened portion, wherein the flattened portion extends in the longitudinal direction of the limb.

In typical embodiments, the first bolt carrier and the second bolt carrier are both designed for connection to a shaft. The bolt-type angular gear mechanism is typically designed for transmitting a rotational movement or a torque between a first shaft, which is connected to the first bolt carrier, and a second shaft, which is connected to the second bolt carrier. The first bolt carrier is typically mounted rotatably about the first axis. The second bolt carrier is typically mounted rotatably about the second axis.

Typically, the first axis and the second axis define an angle of greater than 0 degree, in particular greater than 45 degrees or greater than 85 degrees. In typical embodiments, the first axis and the second axis define an angle of less than 180 degrees, in particular of less than 135 degrees or less than 95 degrees. In typical embodiments, the first axis and the second axis define an angle of at least substantially 90 degrees, in particular of precisely 90 degrees. Here, an angle is to be understood to mean the internal angle, that is to say the smallest angle spanned by two axes.

Typically, the first bolt carrier is formed at least partially conically around the first axis or the second bolt carrier is formed at least partially conically around the second axis. In particular, the first bolt carrier and the second bolt carrier can each be formed conically in an axial region, in which inlets of the bolt receptacles for inserting the angular bolts are arranged. 'Conically' is understood to mean, in particular, that an outer surface of the first bolt carrier or of the second bolt carrier is in the form of a conical surface or frustoconical surface, in particular with an opening angle that corresponds at least substantially to the angle between the first axis and the second axis.

In typical embodiments, the first bolt carrier and the second bolt carrier are of solid design along the respective axis, in particular in an axial region of the bolt carriers. In further typical embodiments, the first bolt carrier and the second bolt carrier are of at least partially hollow design along the respective axis, in particular in the axial region of the bolt carriers.

Typically, the first bolt carrier comprises first bolt receptacles for receiving or guiding first limbs of the angular bolts. Typically, the second bolt carrier comprises second bolt receptacles for receiving or guiding second limbs of the angular bolts. In embodiments, the first bolt carriers are designed at least substantially parallel to the first axis. Typically, the second bolt carriers are designed at least substantially parallel to the second axis.

In typical embodiments, the first bolt carriers and the second bolt carriers are of cylindrical design. Typically, the first bolt carriers and the second bolt carriers are each of cylindrical design from an inlet of the bolt receptacle as far as a maximum insertion depth, down to which a limb of an angular bolt enters the bolt receptacle at most. In particular, the first bolt receptacles and the second bolt receptacles have a constant, at least substantially circular, cross section from the inlet as far as the maximum insertion depth in the respective axial direction.

In typical embodiments, the first bolt receptacles and the second bolt receptacles are each in the form of a blind bore. Typically, a blind bore of a bolt receptacle is closed at an end of the bolt receptacle that is axially opposite the inlet of the bolt receptacle. The blind bore is typically of cylindrical form at least over the insertion length of a limb of an angular bolt into the bolt receptacle. The end of the bolt receptacle can be of pointed or flat form, for example. Blind bores as bolt receptacles can allow, in particular, simple and precise manufacture of the bolt receptacles.

Typically, the blind bores are closed. In particular, the blind bores do not have any further opening apart from the inlet of the bolt receptacle for inserting a limb. In further typical embodiments, the blind bores can have, in addition to the inlet, an oil discharge opening, in particular an oil discharge opening in a direction which is angled in relation to a longitudinal axis of the blind bore, for example perpendicularly in relation to the longitudinal axis of the blind bore. In embodiments, an oil discharge opening can form a fluid connection between the blind bore and an interior of a bolt carrier which is of at least partially hollow design.

In typical embodiments, the angular bolts each comprise a first limb and a second limb, which is angled in relation to the first limb. Typically, the limbs are arranged at an angle of 90° in relation to each other. In typical bolt-type angular gear mechanisms, the first limb of an angular bolt is at least partially received in a first bolt receptacle of the first bolt carrier and the second limb of the angular bolt is at least partially received in a second bolt receptacle of the second bolt carrier. Typically, the first limb and the second limb of an angular bolt are rigidly connected to each other. Typically, the bolt-type angular gear mechanism comprises 8 angular bolts, but at least 4 angular bolts, in particular at least 6 or at most 12 angular bolts, in particular at most 10.

In typical bolt-type angular gear mechanisms, the first limb is oriented at least substantially parallel to the first axis. Typically, the second limb is oriented at least substantially parallel to the second axis. In typical embodiments, the bolt angle that is spanned by a first limb longitudinal axis of the first limb and a second limb longitudinal axis of the second limb is at least substantially equal to the angle that is spanned by the first axis and the second axis of the bolt-type angular gear mechanism. In embodiments, the bolt angle can have an angle deviation from the angle that is spanned by the first axis and the second axis of the bolt-type angular gear mechanism. The angle deviation is typically at most 3 degrees, in particular at most 2 degrees or at most 1 degree, or at least 0.01 degree. The angle deviation can serve, in particular, to block the bolt-type angular gear mechanism.

Typically, when driving the first bolt carrier in a first direction of rotation, for example via a first shaft which is connected in a rotationally fixed manner to the first bolt carrier, a torque or a rotational movement is transmitted via the angular bolts to the second bolt carrier and in particular to a second shaft which is connected in a rotationally fixed manner to the second bolt carrier. Typically, the angular bolts move in the oil chamber of the bolt-type angular gear mechanism. In particular, the oil chamber comprises the first bolt receptacles and the second bolt receptacles. In particular, the oil chamber is delimited by a housing of the bolt-type angular gear mechanism.

During a rotational movement of the first bolt carrier and of the second bolt carrier, the angular bolts typically each move on a circulating path, which is inclined in relation to the first axis and in relation to the second axis and has a maximum insertion position, in particular the inlets of the first bolt receptacles and of the second bolt receptacles being closest to the maximum insertion position, and a minimum insertion position, which is typically opposite the maximum insertion position along the circulating path. Typically, the limbs of an angular bolt enter the first bolt receptacle or the second bolt receptacle in the maximum insertion position as far as the maximum insertion depth. Typically, primarily the angular bolts that are currently located in the vicinity of the maximum insertion position are responsible for transmitting torque between the bolt carriers, for play or for synchronization of the bolt-type angular gear mechanism. During the rotational movement, the limbs of an angular bolt typically enter a first bolt receptacle or a second bolt receptacle in the circulating direction of the rotational movement between the minimum insertion position and the maximum insertion position and then again partially exit from the first bolt receptacle or the second bolt receptacle. In known bolt-type angular gear mechanisms, high power losses, for example shear losses, splash losses, suction losses or compression losses, usually occur during the circulating movement of the angular bolts in the oil chamber, in particular during the entry and exit. The power losses can usually considerably reduce a degree of efficiency of a bolt-type angular gear mechanism.

In typical bolt-type angular gear mechanisms, the limbs of the angular bolts, in particular the first limbs and the second limbs, each have a flattened portion, wherein the flattened portion extends in the longitudinal direction of the limb. In typical embodiments, a flattened portion of a limb comprises an inner flattened portion of the limb or an outer flattened portion of the limb, in particular an inner flattened portion and an outer flattened portion. Here, the terms 'on the inside', 'on the outside', 'limb inner side' or 'limb outer side' are intended to be understood with respect to a limb or angular bolt, in particular relative to the bolt angle between the first limb and the second limb. For example, "on the inside" or "limb inner side" relate, in particular, to a side of a limb that is situated at the bolt angle or faces the bolt angle. In particular, the limb inner side of a limb of an angular bolt faces the other limb of the angular bolt. "On the outside" or "limb outer side" can each relate, in particular, to a side of a limb opposite the inner side or limb inner side.

Typically, the inner flattened portion or the outer flattened portion of a limb each comprise a surface that is oriented parallel to a limb longitudinal axis of the limb.

In typical embodiments, the inner flattened portion or the outer flattened portion are formed over at least a substantial portion of the length of the limb. For example, the inner flattened portion of the outer flattened portion can be formed over at least 50%, in particular at least 60%, at least 70% or at least 80%, of the length of the limb. In other embodiments, the inner or outer flattened portion can extend over only 20% of the limb length. Typically, the inner flattened portion or the outer flattened portion is formed as far as the end side of the limb. In embodiments, the inner flattened portion or the outer flattened portion are formed over the entire length of the limb. The inner flattened portion or the outer flattened portion can, for example when the limb enters a bolt receptacle, allow the oil to flow out of the bolt receptacle or, when the limb exits from the bolt receptacle, allow the oil to continue to flow into the bolt receptacle, in particular in the case of a bolt receptacle which is closed apart from the inlet and is designed as a blind bore. For example, suction or compression of the oil can be reduced. In particular, a power loss of the bolt-type angular gear mechanism can be reduced.

The flattened portion constitutes a recess with respect to a cylinder shape. In embodiments, the cylinder shape is understood to mean, in particular, a cylindrical fitting shape of a limb for fitting with the cylindrical first bolt receptacle or the cylindrical second bolt receptacle. In embodiments, the cylinder shape can be understood to mean a cylindrical envelope of a limb. The limb can have a reduced cross section in the region of the flattened portion with respect to the cylinder shape in each case. Flattened portions according to embodiments can reduce, in particular, splash losses, compression losses, suction losses or shear losses during the movement of the angular bolts.

In typical embodiments, the limbs each have a cylindrical region. The flattened portion forms a recess with respect to a cylinder shape of the cylindrical region. Typically, the cylindrical region has a first limb surface, wherein the first limb surface is at least partially in the form of a cylinder lateral surface. Typically, the cylinder lateral surface is formed around a limb longitudinal axis of the limb. In embodiments, the cylinder lateral surface is formed for fitting into a cylindrical first bolt receptacle or a cylindrical second bolt receptacle. A cylinder lateral surface can be a surface of a portion of a cylinder casing. For example, in the cylindrical region, the first limb surface can comprise a portion of the cylinder lateral surface between an inner flattened portion and an outer flattened portion around the limb longitudinal axis in the circumferential direction, wherein the portions of the cylinder lateral surface are designed for fitting the limb into a bolt receptacle. In embodiments, the cylindrical region extends over at least 50% of the axial length of the limb, in particular over at least 60% or at least 70%, or at most 90%, in particular at most 80%. In further typical embodiments, the cylindrical region can extend over an axial length of at least 80% or over the entire axial length of the limb. Typically, the cylindrical region is formed in an end region of the limb, the end region adjoining the bolt angle. A cylindrical region of a limb, which cylindrical region is at least partially formed to fit with a bolt receptacle, can in particular advantageously be supported in a bolt receptacle for transmitting torque.

In typical embodiments, the limbs each have a conical region of the limb, the conical region adjoining an end side of the limb. In this region, the limb is formed conically at least in portions and has a cross section that decreases in the direction of the end side. Typically, the limbs have a second limb surface in the conical region, wherein the second limb surface is at least partially in the form of a conical lateral surface. Typically, the conical lateral surface is formed around a limb longitudinal axis of the limb. A conical lateral surface can be, in particular, a surface of a portion of a cone casing, for example a frustoconical lateral surface or a portion of a frustoconical lateral surface. Typically, the frustoconical lateral surface is formed between the flattened portions in the circumferential direction. The conical region extends over at least 20%, at least 30% or at least 50% of the limb length.

In embodiments, the limbs each have a cylindrical region and a conical region. Typically, the conical region is formed in a manner adjoining the end side. Typically, the cylindrical region is formed between the conical region and that end of the limb opposite the end side. Typically, the conical region extends over the axial remaining length of the axial component or the axial length of the limb. For example, the cylindrical region can extend over 75% of the axial length of the limb and the conical region can extend over 25% of the axial length of the limb. In embodiments, a transition between the cylindrical region and the conical region can be rounded, for example with a transition radius.

Typically, a cone angle of the conical region is at most 2 degrees, in particular at most 1.5 degrees, at most 1 degree or at most 0.8 degree, or at least 0.03 degree, in particular at least 0.05 degree, at least 0.07 degree or at least 0.1 degree. For example, the cone angle can be 0.8 degree. The cone angle is understood to mean, in particular, an opening angle of a conical lateral surface of the conical region.

According to embodiments, a conical region of the limb can produce, in particular, losses of the bolt-type angular gear mechanism. In particular, shear losses of the oil due to shortening the fitting surface between the limb and the bolt receptacle can be reduced. A shortened fitting surface can reduce the production costs for the angular bolts. Owing to a conical region, the formation of a hydrodynamic lubricating film in the regions that are subject to the most loading, for example in a cylindrical region, can be facilitated. The conical region can provide sufficient guidance for the angular bolt in a bolt receptacle.

A cylindrical region which is arranged close to the bolt angle can advantageously provide efficient transfer of force between the angular bolt and the bolt receptacle. Furthermore, a position of a press contact between the limb and the bolt receptacle at the transition between the cylindrical region and the conical region can advantageously be defined by a cylindrical region and a conical region according to embodiments in the event of transmission of torque. A further press contact is typically made at the inlet of the bolt receptacle.

In embodiments, the angular bolts are each rounded with an inner rounded portion between the inner flattened portions of the two limbs. The inner rounded portion is formed, in particular, on the inside between the two limbs.

In embodiments, a point positioned on the inner rounded portion and on an angle bisector of the two limbs is situated within a first cylindrical envelope of the first limb and within a second cylindrical envelope of the second limb. In embodiments, a point positioned on the inner rounded portion and on an angle bisector of the two limbs is situated at a point of intersection of the cylindrical envelopes of the two limbs. The angle bisector is, in particular, the angle bisector of the bolt angle. In embodiments, a first portion of the inner rounded portion, which first portion is situated on the side of the first limb with respect to the angle bisector, is arranged completely within the first cylindrical envelope. Typically, a second portion of the inner rounded portion, which second portion is situated on the side of the second limb with respect to the angle bisector, is arranged completely within the second cylindrical envelope. Embodiments can provide, in particular, an inner rounded portion, without adversely affecting entry of a region of the limbs, the region being positioned close to the angle bisector. The configuration of the inner rounded portion provides optimum electrical pressure distribution in the region of the angle bisector.

Typically, the angular bolts are each rounded with an outer rounded portion between outer flattened portions of the two limbs in the region of the angle bisector. Owing to the outer rounded portion of the angular bolt, for example splash losses during the movement of the angular bolt in the oil chamber can be reduced or unnecessary bending stiffness of the angular bolt can be reduced. In particular, the bolt-type angular gear mechanism can be constructed to be less sensitive to tolerances.

In typical embodiments, the limbs each comprise a cutout, which is in the form of a pocket, in the longitudinal direction of the limb. Typically, the pocket is arranged on a limb inner side or a limb outer side. In typical embodiments, the limbs each comprise precisely one pocket. In further typical embodiments, the limbs each comprise at least two pockets. For example, the limbs can each comprise precisely two pockets, which are in particular respectively arranged on an inner side and an outer side of the limb. The pockets extend over at least 10%, or over in particular at least 20% and at most 70%, in particular at most 50%, of the length of the limb. Typically, the pockets on a limb inner side are shorter than the pockets on a limb outer side, for example the pockets on the inner side of the limbs have a length of 20-30% and the pockets on the outer side of the limbs have a length of 30-50% of the limb length. In embodiments, a central web is formed along the limb longitudinal axis in the region of the pocket. This increases the rigidity of the bolt and serves as a clamping surface during production.

In typical embodiments, the limbs have two or more pockets on a limb inner side or a limb outer side. Typically, the pockets are of different lengths in the longitudinal direction of the limb. In embodiments, four pockets are formed an outer side of the limb and three pockets are formed on a limb inner side.

Typically, the pocket comprises a pocket base surface, which is oriented parallel to the limb longitudinal axis, and pocket side walls, which adjoin the pocket base surface. In typical embodiments, the pocket side walls, which are arranged in the longitudinal direction of the limb, are inclined in relation to an orthogonal to the longitudinal direction of the limb. These can be in the form of oil discharge slopes and provide improved discharge of the oil from the bolt receptacle or contribute to improved producibility of the bolt.

In a further embodiment, the limbs have a cutout, which is in the form of a pocket, in the longitudinal direction of the limb, the cutout extending as far as an end side of the angular bolt. Typically, a pocket, which is provided in a limb, extends in the direction of the limb longitudinal axis over at least 10% of the axial length of the limb, in particular over at least 20%, or over at most 90%, in particular over at most 80%, or over the entire limb length, in the direction of the limb longitudinal axis. In a typical embodiment, a pocket is formed on an inner side of the limb from the end side as far as the angle bisector. In embodiments, two pockets can be provided on each limb, the pockets typically being arranged on an inner side and an outer side of the limb.

Pockets according to embodiments can lead, in particular, to improved oil transport and improved lubrication in the bolt receptacles and reduce power loss of a bolt-type angular gear mechanism due to pumping losses or splash losses when the angular bolts enter the bolt receptacles, in particular when the angular bolts enter bolt receptacles that are designed as closed blind bores.

In embodiments, a pocket is arranged in a conical region or a cylindrical region. Typically, the pocket adjoins a partial surface of a conical lateral surface or a partial surface of a cylindrical lateral surface around the limb longitudinal axis in a circumferential direction, in particular in both circumferential directions. In embodiments, a pocket forms a further recess with respect to a cylinder shape, in particular a cylindrical envelope of a limb. A pocket according to embodiments can reduce power loss, for example without adversely affecting secure guidance of the angular bolt in the bolt receptacle or reducing transmission of torque.

In a further embodiment, a bolt is composed of two bolt halves along its limb longitudinal axes, in particular along a plane that is spanned by the limb longitudinal axes. A bolt half has two limbs, which are arranged at a right angle in relation to each other. A planar contact surface is formed along the limb longitudinal axis in each case. In typical embodiments, the bolt halves are connected to each other in a force-fitting or cohesive manner, for example screwed or adhesively bonded. In the case of bolt halves that are connected by means of screws, bores are provided in the first and the second bolt halves, wherein the bores of the first bolt half and the bores of the second bolt half are coaxial in pairs. The bores are arranged along the limb longitudinal axes and extend perpendicularly in relation to the limb longitudinal axes. Typically, the two bolt halves can be inserted into the bolt receptacles loosely, without being connected to each other. Owing to the two bolt carriers that are arranged at a right angle in relation to each other, the two halves are securely and simultaneously guided. Owing to the angular bolt being in the form of two bolt halves, simplified producibility can be achieved.

In typical embodiments, at least one cross section of the limb has a border surrounding an at least partially encircling arc of a circle. Typically, the center point of the arc of a circle lies on the limb longitudinal axis. The arc of a circle can be formed to fit with the receptacle cross section of a first bolt receptacle or of a second bolt receptacle, in particular in a cylindrical region. In further typical embodiments, a radius of the arc of a circle can be smaller than a radius of a cylindrical shape that fits with a bolt receptacle, for example in a conical region of the limb. In embodiments, the border comprises at least two arcs of a circle, which are spaced apart from each other in the circumferential direction. In particular, the border can have precisely two arcs of a circle. The two arcs of a circle can extend, in particular, in each case in the circumferential direction over an arc of a circle angle of at least 70 degrees or at most 150 degrees, for example over an arc of a circle angle of 100 degrees. For example, the border of a cross section of a limb in a region either with an inner flattened portion and an outer flattened portion or with two pockets can have precisely two arcs of a circle. Typical bolt-type angular gear mechanisms can offer the advantage over the prior art that a degree of efficiency when transmitting rotational movements can be improved, in particular in respect of splash, compression, suction or shear losses during a movement of the angular bolts. In particular, flattened portions or cutouts according to embodiments can improve a flow of oil into bolt receptacles or out of bolt receptacles. Flattened portions or cutouts according to embodiments can guide oil for forming a lubricating film between a wall of the bolt receptacle and the surface of the limb. Furthermore, in embodiments, production costs can be reduced for example, in particular costs for creating fitting surfaces on the limbs of the angular bolts.

BRIEF DESCRIPTION OF THE DRAWINGS

The invention will be explained in more detail below with reference to the appended drawings, in the figures of which:

FIG. 7b shows a diagrammatic sectional view of the angular bolt according to FIG. 7a;

DETAILED DESCRIPTION

In the following text, typical embodiments of the invention will be described on the basis of the figures, the invention not being restricted to the exemplary embodiments, but rather the scope of the invention being determined by way of the claims. In the description of the embodiments, the same reference signs are used in some circumstances for identical or similar parts in different figures and for different embodiments. Features which have already been described in conjunction with different figures are in part not described again for the sake of clarity. For the sake of clarity, not all the respective features are partially provided with a reference sign, for example the angular bolts (reference sign 3).

Figure 1:
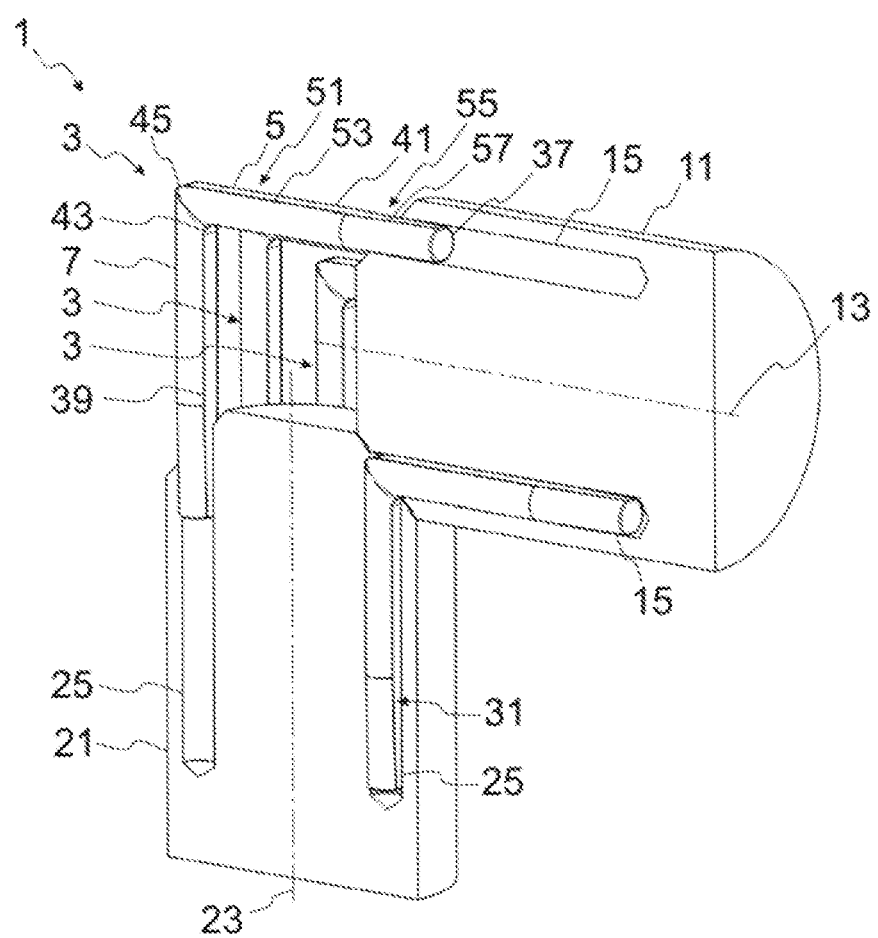
FIG. 1 shows a diagrammatic sectional view of a bolt-type angular gear mechanism according to one embodiment.

FIG. 1 shows a diagrammatic sectional view of a bolt-type angular gear mechanism 1, wherein angular bolts 3 of the bolt-type angular gear mechanism 1 are not illustrated in section for better illustration of the embodiment. The bolt-type angular gear mechanism 1 comprises a first bolt carrier 11, which is rotatable about a first axis 13, and a second bolt carrier 21, which is rotatable about a second axis 23. In FIG. 1, the first axis 13 and the second axis 23 are oriented perpendicularly in relation to each other. The first bolt carrier 11 and the second bolt carrier 21 are connected or coupled to each other via the angular bolts 3. The angular bolts 3 each comprise two limbs, which are oriented at least substantially perpendicularly in relation to each other, in particular a first limb 5 and a second limb 7. The first limb 5 and the second limb 7 are rigidly connected to each other at a respective end. The first limbs 5 of the angular bolts 3 are each at least partially received in a first bolt receptacle 15 of the first bolt carrier 11. The second limbs 7 of the angular bolts 3 are each at least partially received in a second bolt receptacle 25 of the second bolt carrier 21.

FIG. 1 shows a plurality of angular bolts 3 in different positions along a circulating path of the angular bolts 3. In particular, one of the angular bolts 3 is illustrated in a maximum insertion position, wherein the limbs of the angular bolt 3 are inserted into the bolt receptacles as far as the maximum insertion depth. A further angular bolt 3 exits to the furthest extent from the bolt receptacles in the minimum insertion position, which is opposite the maximum insertion position in the circulating direction. The first bolt receptacles 15 and the second bolt receptacle 25 are each formed cylindrically and as closed blind bores over the maximum insertion depth, in particular without further openings apart from an inlet for inserting a limb into the bolt receptacle.

The limbs of the angular bolts 3 each have an inner flattened portion 39 on a limb inner side of the limb, an outer flattened portion 41 on a limb outer side of the limb, and a conical region 55, which adjoins an end side 37 of the limb. A second limb surface 57 is in the form of a conical lateral surface, in particular in the form of a portion of a frustoconical lateral surface, laterally between the inner flattened portion 39 and the outer flattened portion 41 in the conical region 55. The limbs each comprise a cylindrical region 51 between the conical region 55 and that end of the limb opposite the end side 37. A first limb surface 53 is in the form of a cylinder lateral surface laterally between the inner flattened portion 39 and the outer flattened portion 41 in the cylindrical region 51, in particular in a manner fitting with the first bolt receptacle 15 or the second bolt receptacle 25.

Figure 2:
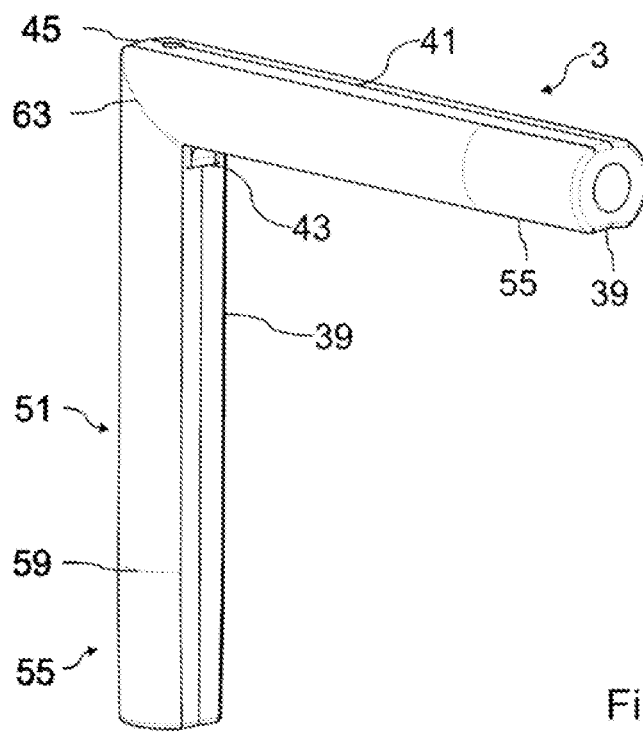
FIG. 2 shows a diagrammatic isometric view of an angular bolt of a gear mechanism according to FIG. 1.

FIG. 2 shows an isometric view of an angular bolt illustrated in FIG. 1.

As illustrated in FIG. 1 and FIG. 2, the inner flattened portion 39 and the outer flattened portion 41 extend over the entire length of a limb from the end side 37. The angular bolts 3 each have an outer rounded portion 45 in a region of an angle bisector 63 of the angular bolts 3 between the outer flattened portions 41 of the limbs and an inner rounded portion 43 between the inner flattened portions 39 of the limbs. A region 55 that is conical in parts is formed in a manner adjoining an end side of the limb between the inner flattened portion and the outer flattened portion in the circumferential direction. A transition 59 between the conical region 55 and the cylindrical region 51 is rounded with a transition radius. The inner flattened portion 39 and the outer flattened portion 41 are each formed from two planes that are slightly inclined in relation to each other. The flattened portion constitutes a recess with respect to a cylinder shape, in particular with respect to a cylindrical envelope of the limb.

Figure 3:
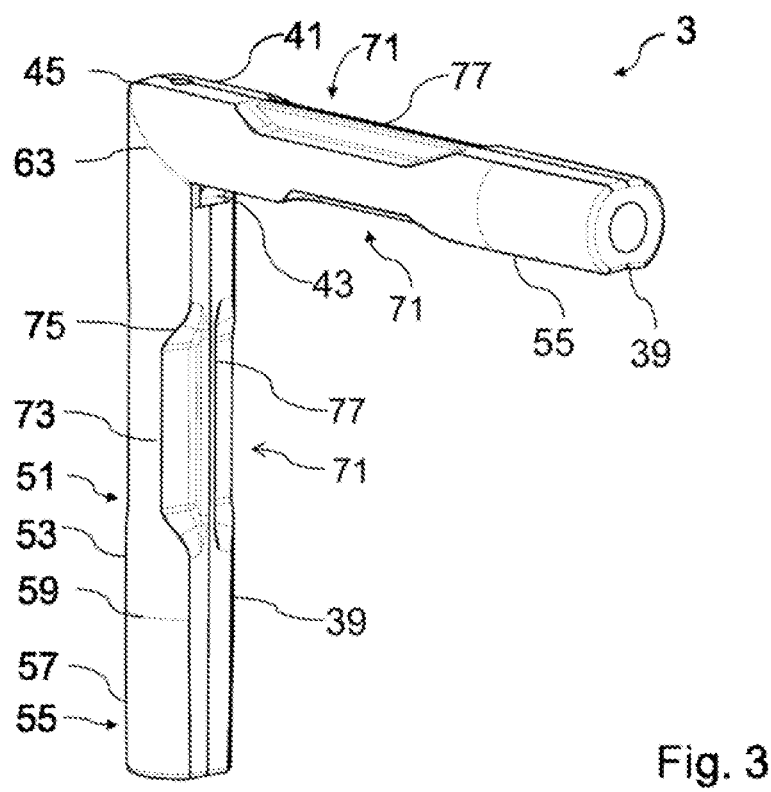
FIG. 3 shows a diagrammatic isometric view of a further angular bolt.

FIG. 3 shows a further angular bolt 3. The limbs of the angular bolt 3 comprise an inner flattened portion 39, an outer flattened portion 41 and a respective cutout, which is in the form of a pocket 71, on a limb inner side and a limb outer side. A web 77 runs through the pocket 71 along a limb longitudinal axis 46, 48. The web 77 can improve the rigidity of the bolt and lead to improved producibility of the bolt. The pocket has a pocket base surface 73. The pocket 71 has pocket side walls 75 in the longitudinal direction of the limb, the pocket side walls being in the form of oil discharge slopes. The pocket side walls are inclined in relation to an orthogonal to the limb longitudinal axis. The pockets 71 can guide, in particular, oil between the lateral surfaces of the limb and the walls of the bolt receptacles. A conical region is formed in a manner adjoining the end side of the limb. The conical region extends over approximately 25% of the entire limb length. The conical region 55 of a limb has a second limb surface 57, which is formed between the inner and the outer flattened portion in the longitudinal direction of the limb and is at least partially in the form of a frustoconical lateral surface. A cylindrical region 51 of the limb has a first limb surface 53, which is at least partially designed as a cylinder lateral surface along the limb longitudinal axis. A transition 59 between the conical region 57 and the cylindrical region 51 is rounded with a transition radius.

Figure 4:
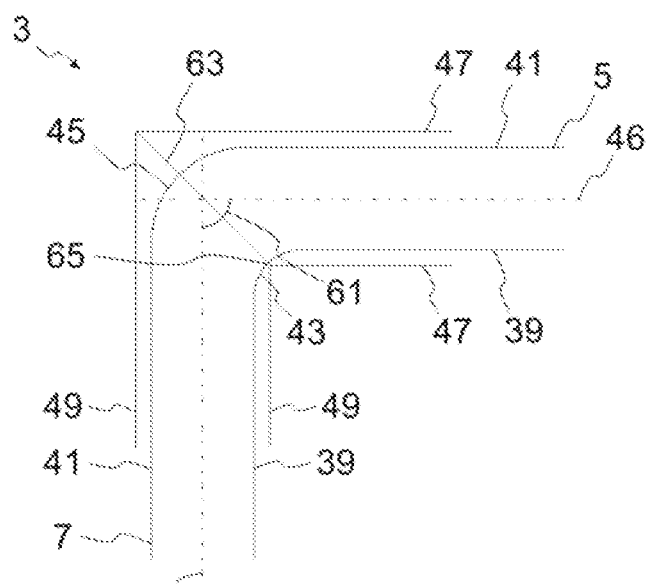
FIG. 4 shows a diagrammatic sectional view of an angular bolt.

FIG. 4 shows a diagrammatic sectional view of an angular bolt 3. The first limb 5, which is oriented along a first limb longitudinal axis 46, spans a bolt angle 61 with the second limb 7, which is oriented along a second limb longitudinal axis 48. The bolt angle 61 is bisected by the angle bisector 63. As illustrated in FIG. 4, a first portion of the inner rounded portion 43, which first portion is positioned on the side of the first limb 5 with respect to the angle bisector 63, is situated within a first cylindrical envelope 47 of the first limb 5. A second portion of the inner rounded portion 43, which second portion is positioned on the side of the second limb 7 with respect to the angle bisector 63, is situated within a second cylindrical envelope 49 of the second limb 7. In particular, a point 65, which is positioned on the inner rounded portion 43 and on the angle bisector 63, is situated within the first cylindrical envelope 47 and within the second cylindrical envelope 49.

Figure 5:
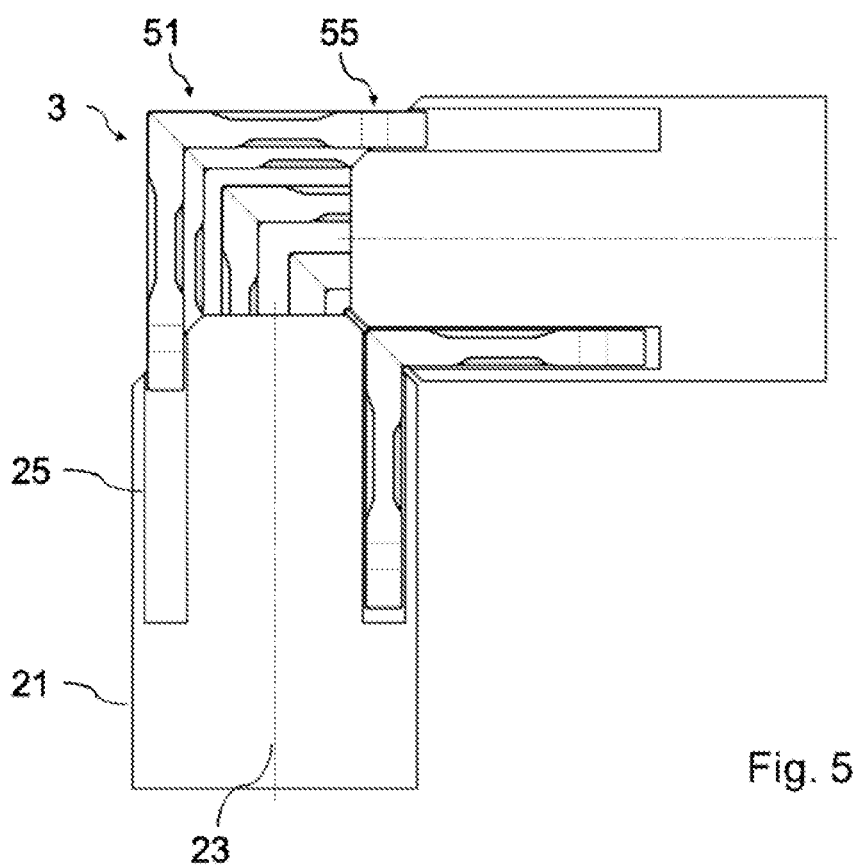
FIG. 5 shows a diagrammatic view of a bolt-type angular gear mechanism with bolt carriers illustrated in section.

FIG. 5 shows a diagrammatic view of a further bolt-type angular gear mechanism 1, wherein the first bolt carrier 11 and the second bolt carrier 21 are illustrated in section for better illustration of the embodiment. The bolt-type angular gear mechanism 1 comprises, in particular, angular bolts 3 according to the illustration in FIG. 3.

Figure 6:
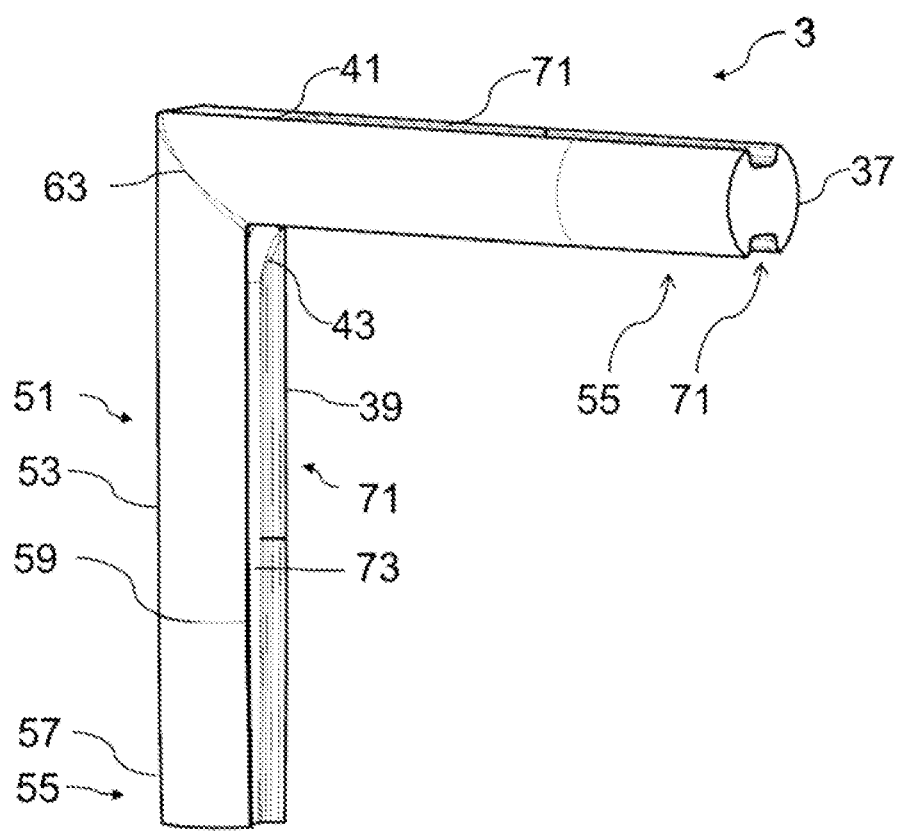
FIG. 6 shows a diagrammatic isometric view of an angular bolt of a further embodiment.
Figure 7A:
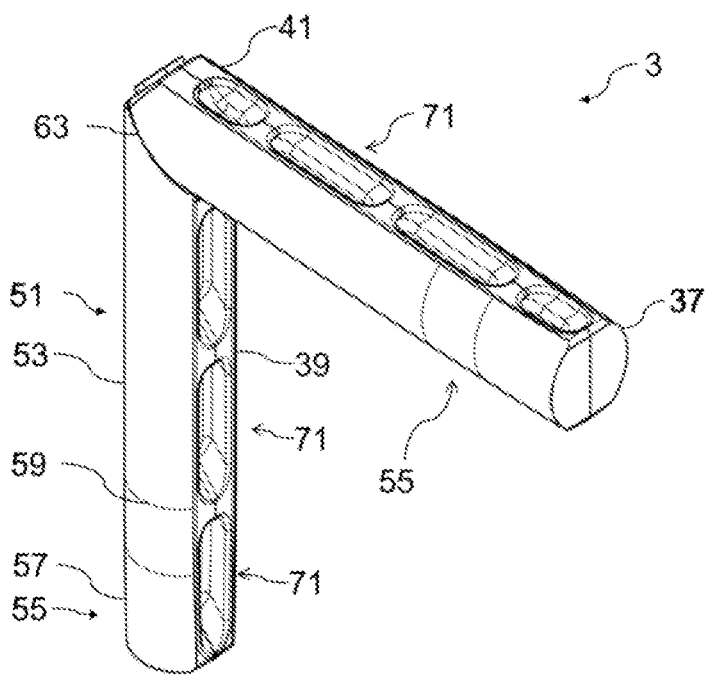
FIG. 7a shows a diagrammatic isometric view of a further angular bolt.
Figure 7B:
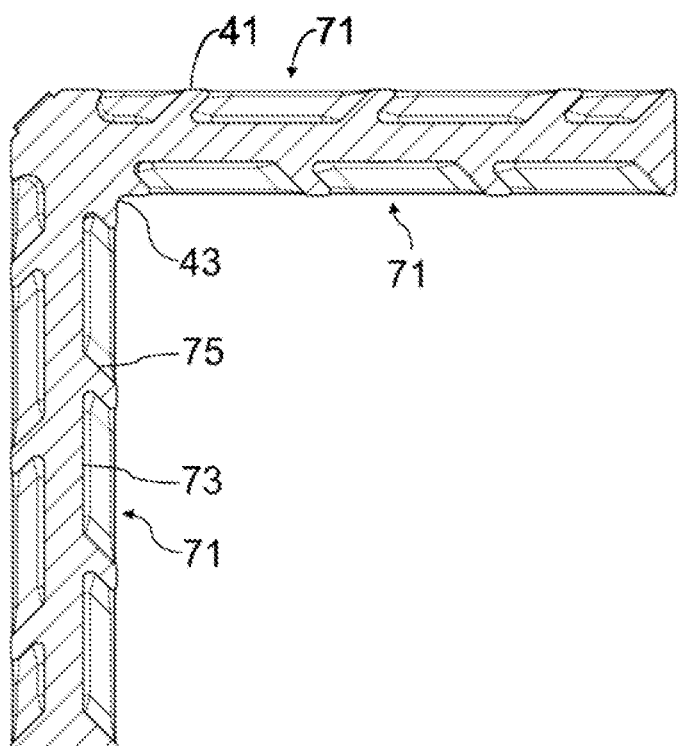

FIG. 6 shows an angular bolt 3 of a further embodiment with an outer flattened portion 41 and an inner flattened portion 39 as well as a pocket 71 on the limb outer side and the limb inner side, the pocket being formed as far as an end side of the limb. The pocket extends over the width of the flattened portion in the circumferential direction. The pocket extends over a length of approximately 85% of the entire limb length on the outer side. On the limb inner side, the pocket extends from the end side as far as into the region of the angle bisector. The pocket therefore extends substantially over the entire surface of the inner flattened portion 39. The inner sides of the two limbs are rounded with an inner rounded portion 43 in the region of the angle bisector 63. FIG. 7a shows an isometric view of a further angular bolt with an inner flattened portion 39, an outer flattened portion 41, a conical region 55 as well as a plurality of pockets 71, which extend in the limb longitudinal direction. The pockets 71 are arranged on the limb inner side in the region of the inner flattened portion and of the limb outer side in the region of the outer flattened portion. FIG. 7b shows a diagrammatic sectional view of the angular bolt 3 according to FIG. 7a. The pockets have pocket base surfaces 73, wherein the pocket side walls 75, which adjoin the base surfaces in the longitudinal direction of the limb, are inclined in relation to an orthogonal to the longitudinal direction of the limb. The pocket side walls are inclined in the direction of the end side. Instead of a rounded portion, a chamfer is formed between the outer flattened portions of the two limbs. The inclined pocket side walls as well as the chamfer can improve and simplify production of the bolts. A geometry of this kind is advantageous for production by means of metal injection molding.

Figure 8:
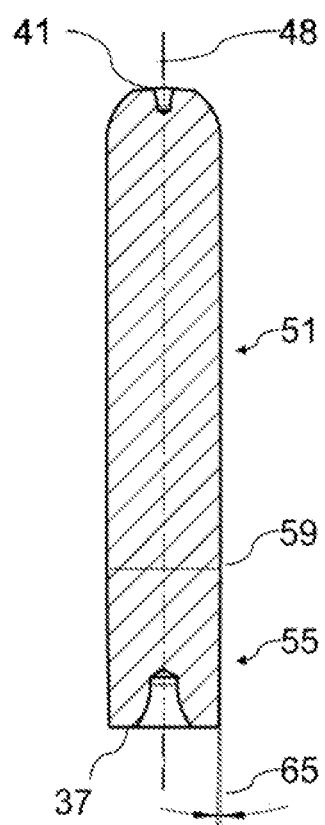
FIG. 8 shows a diagrammatic sectional view of the bolt according to FIG. 3.

FIG. 8 shows a further diagrammatic section through an angular bolt according to FIG. 3 along a limb longitudinal axis 48 with a cylindrical region 51 and a conical region 55. The conical region tapers in the direction of the end side 37 of the limb and has a cone angle 65. The cone angle 65 of the conical region is, for example, 0.8° in relation to the limb longitudinal axis.

Figure 9A:
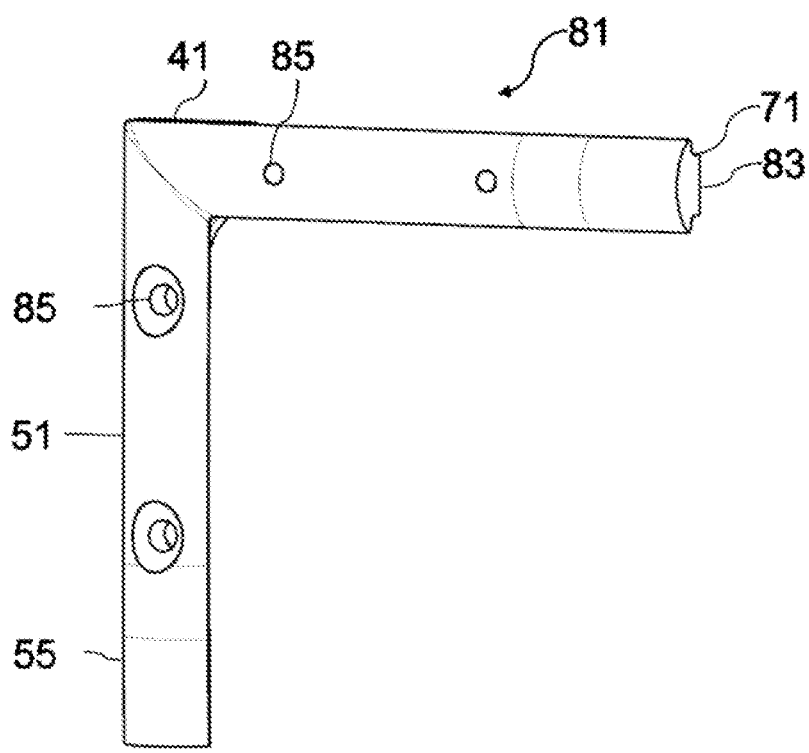
FIG. 9a shows a diagrammatic sectional view of a bolt half of a further angular bolt.
Figure 9B:
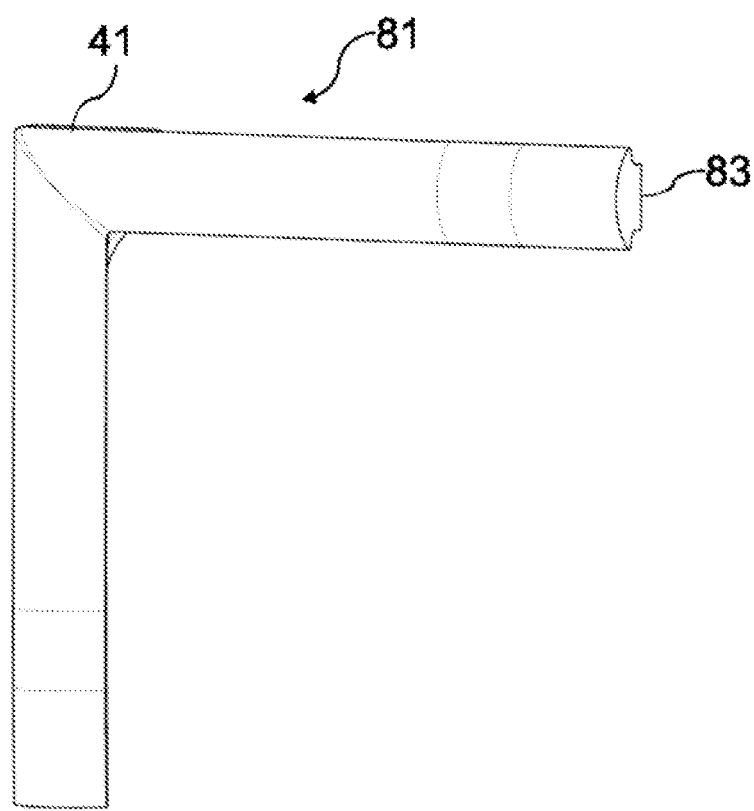
FIG. 9b shows a diagrammatic sectional view of a bolt half of an angular bolt.

FIG. 9a shows a bolt half 81 of a further angular bolt. A bolt half 81 has two limb halves, which are arranged at a right angle in relation to each other. A planar contact surface 83 for making contact with a second bolt half is formed along the limb longitudinal axes 46, 48. The bolt halves have an outer flattened portion 41 as well as an inner flattened portion 39. The bolt halves have a cutout on a limb inner side and a cutout on the limb outer side. The cutouts of two bolt halves form a pocket 71. The bolt half 81 has screw openings 85, which are arranged orthogonally in relation to the limb longitudinal axis. The screw opening 85 can be in the form of screw passage bore or threaded bore. A first bolt half has at least one screw passage bore, and the second bolt half has a threaded bore which is arranged coaxially in relation to the screw passage bore. Two screw openings are provided for each limb. Screws can be screwed into the screw openings 85, which are arranged coaxially in relation to each other, of the two bolt halves in order to connect the two bolt halves in a force-fitting manner. In a bolt half according to FIG. 9b, the bolt half does not have any screw openings. The bolt halves can be inserted into the bolt receptacles cohesively, e.g. by adhesive bonding, or loosely connected. The angular bolts, which are composed of bolt halves, have improved producibility, in particular they can be produced in a simple manner by means of electrochemical metal machining.

The invention claimed is:

1. A bolt-type angular gear mechanism (1), comprising angular bolts (3) each with two limbs, which are angled in relation to each other,
a first bolt carrier (11), which is rotatable about a first axis (13) and has first bolt receptacles (15), in each of which a first limb (5) of one of the angular bolts (3) is at least partially received, and
a second bolt carrier (21), which is rotatable about a second axis (23), which is different from the first axis (13), and has second bolt receptacles (25), in each of which a second limb (7) of one of the angular bolts (3) is at least partially received, so that the first bolt carrier (11) and the second bolt carrier (21) are connected by means of the angular bolts (3),
wherein the limbs of the angular bolts (3) have a flattened portion (39, 41), wherein the flattened portion extends in the longitudinal direction of the limb, and wherein the flattened portion at least partially slides into at least one of the first bolt receptacles (15) and the second bolt receptacles (25).

2. The bolt-type angular gear mechanism (1) according to claim 1, wherein the flattened portion (39, 41) is formed over at least 20% of the length of the limb.

3. The bolt-type angular gear mechanism (1) according to claim 1, wherein the flattened portion is in the form of an inner flattened portion (39) or in the form of an outer flattened portion (41).

4. The bolt-type angular gear mechanism (1) according to claim 1, wherein the angular bolts (3) are each rounded with an inner rounded portion (43) between inner flattened portions (39) of the two limbs.

5. The bolt-type angular gear mechanism (1) according to claim 4, wherein a point (65) positioned on the inner rounded portion (43) and on an angle bisector (63) of the two limbs is situated within a first cylindrical envelope (47) of the first limb (5) and within a second cylindrical envelope (49) of the second limb (7).

6. The bolt-type angular gear mechanism (1) according to claim 1, wherein the limbs each have a cylindrical region (51) with a first limb surface (53), wherein the first limb surface (53) is at least partially in the form of a cylinder lateral surface.

7. The bolt-type angular gear mechanism (1) according to claim 1, wherein the limbs each have a second limb surface (57) in a conical region (55) of the limbs, the conical region adjoining an end side (37) of the limbs, wherein the second limb surface (57) is at least partially in the form of a frustoconical lateral surface.

8. The bolt-type angular gear mechanism (1) according to claim 7, wherein the conical region (55) extends over at least 20% of the length of the limb.

9. The bolt-type angular gear mechanism (1) according to claim 7, wherein a cone angle (65) of the conical region (55) is at most 2 degrees and/or at least 0.03 degree.

10. The bolt-type angular gear mechanism (1) according to claim 1, wherein the limbs comprise at least one cutout, which is in the form of a pocket (71) and extends in the longitudinal direction of the limbs.

11. The bolt-type angular gear mechanism according to claim 10, wherein the pocket (71) comprises a plurality of pockets (71), and wherein the limbs have at least one pocket (71) of the plurality of pockets (71) on a limb inner side and one pocket (71) of the plurality of pockets (71) on a limb outer side.

12. The bolt-type angular gear mechanism (1) according to claim 10, wherein the pocket (71) comprises a pocket base surface (73) and an oil discharging slope, which adjoins the pocket base surface (73) in the longitudinal direction of the limbs.

13. The bolt-type angular gear mechanism (1) according to claim 10, wherein the pocket (71) extends as far as an end side (37) of the limb.

14. The bolt-type angular gear mechanism (1) according to claim 1, wherein an angular bolt of the angular bolts is composed of two bolt halves (81) along its limb longitudinal axis.

15. An angular bolt for a bolt-type angular gear mechanism according to claim 1.

16. The bolt-type angular gear mechanism (1) according to claim 1, wherein the flattened portion (39, 41) is formed over an entire length of the limb.

17. The bolt-type angular gear mechanism (1) according to claim 1, wherein the flattened portion (39, 41) is formed over at least 50% of a substantial portion of the length of the limb.

* * * * *